United States Patent
Kaspar et al.

(10) Patent No.: US 9,803,041 B2
(45) Date of Patent: Oct. 31, 2017

(54) SEMI-FLUORINATED THERMOPLASTIC RESINS WITH LOW GEL CONTENT

(71) Applicant: 3M INNOVATIVE PROPERTIES COMPANY, St. Paul, MN (US)

(72) Inventors: Harald Kaspar, Burgkirchen (DE); Klaus Hintzer, Kastl (DE); Tilman C. Zipplies, Burghausen (DE); Thomas J. Blong, Woodbury, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 66 days.

(21) Appl. No.: 14/422,764

(22) PCT Filed: Jul. 16, 2013

(86) PCT No.: PCT/US2013/050633
§ 371 (c)(1),
(2) Date: Feb. 20, 2015

(87) PCT Pub. No.: WO2014/031252
PCT Pub. Date: Feb. 27, 2014

(65) Prior Publication Data
US 2015/0218296 A1 Aug. 6, 2015

Related U.S. Application Data

(60) Provisional application No. 61/691,447, filed on Aug. 21, 2012.

(51) Int. Cl.
*D06M 15/277* (2006.01)
*C08F 214/26* (2006.01)
*C08F 2/30* (2006.01)

(52) U.S. Cl.
CPC .............. *C08F 214/26* (2013.01); *C08F 2/30* (2013.01)

(58) Field of Classification Search
USPC ........................................ 526/242, 254, 255
See application file for complete search history.

(56) References Cited

U.S. PATENT DOCUMENTS

| | | | | |
|---|---|---|---|---|
| 5,895,799 A | * | 4/1999 | Wu | C08F 14/26 524/794 |
| 6,630,047 B2 | | 10/2003 | Jing | |
| 6,716,942 B1 | * | 4/2004 | Saito | B01J 3/008 526/242 |
| 6,753,087 B2 | | 6/2004 | Jing | |
| 6,767,948 B1 | | 7/2004 | Jing | |
| 6,833,403 B1 | | 12/2004 | Bladel | |
| 2004/0072977 A1 | * | 4/2004 | Kaulbach | C08F 259/08 526/247 |
| 2005/0080210 A1 | | 4/2005 | Jing | |
| 2008/0015304 A1 | * | 1/2008 | Hintzer | C08F 2/24 524/544 |

FOREIGN PATENT DOCUMENTS

| | | |
|---|---|---|
| WO | WO 2004-011124 | 2/2004 |
| WO | WO 2004-094491 | 11/2004 |
| WO | WO 2009-009361 | 1/2009 |

OTHER PUBLICATIONS

Hintzer, "Modern Fluoropolymers", 229-230 (1997).
Kaspar, "The extensional viscosity properties of long-chain branched fluorthermoplastics and correlations to molecular structure", Rheol Acta, 2011, vol. 50, No. 5, pp. 577-599.
Shroff, "Assessment of NMR and Rheology for the Characterization of LCB in Essentially Linear Polyethylenes", Macromolecules, 2001, vol. 34, No. 21, pp. 7362-7367.
Shroff, "Long-Chain-Branching Index for Essentially Linear Polyethylenes", Macromolecules, Nov. 1999, vol. 32, No. 25, pp. 8454-8464.
International Search Report for PCT International Application No. PCT/US2013/050633, mailed on Sep. 26, 2013, 3 pages.

\* cited by examiner

*Primary Examiner* — Mark Kaucher
*Assistant Examiner* — Henry Hu
(74) *Attorney, Agent, or Firm* — C. Michael Geise

(57) ABSTRACT

Tetrafluoroethene-based fluoropolymers of low gel content, methods of making the fluoropolymers, methods of extruding the fluoropolymers into articles, and extruded articles comprising the fluoropolymers.

8 Claims, No Drawings

SEMI-FLUORINATED THERMOPLASTIC RESINS WITH LOW GEL CONTENT

CROSS REFERENCE TO RELATED APPLICATIONS

This application is a national stage filing under 35 U.S.C. 371 of PCT/US2013/050633, filed Jul. 16, 2013, which claims priority to U.S. Provisional Patent Application No. 61/691,447, filed Aug. 21, 2012, the disclosure of which is incorporated by reference in its/their entirety herein.

TECHNICAL FIELD

The present description relates to tetrafluoroethene-based polymers with low gel content. The polymers are suitable for making extrusion products. The description also relates to extrusion products containing the tetrafluoroethene-based polymers and to methods for making and extruding the tetrafluoroethene-based polymers.

BACKGROUND

Fluoropolymers have been used in a variety of applications because of several desirable properties such as heat resistance, chemical resistance, weatherability, and UV-stability. Fluoropolymers include, for example, homo and co-polymers of a gaseous fluorinated olefin such as tetrafluoroethene (TFE), chlorotrifluoroethene (CTFE) and/or vinylidene fluoride (VDF) with one or more gaseous or liquid comonomers such as hexafluoropropene (HFP) or perfluorovinyl ethers (PVE) or perfluoroallyl ethers (PAVE) or non-fluorinated olefins such as ethene (E) and propene (P).

Homopolymers of tetrafluoroethene (PTFE) are highly resistant materials with a very high service temperature. However, PTFE is not melt processable by standard melt extrusion equipment because of its extremely high melt viscosity. Therefore, various TFE copolymers have been developed that are thermoplastic and have a reduced melt viscosity making them melt-processable by ordinary melt-processing equipment. Examples of such fluoropolymers include the fluoropolymer classes PFA (copolymers comprising TFE and perfluorinated vinyl ethers), FEP (copolymers comprising TFE and HFP), THV (copolymers comprising TFE, HFP and VDF), HTE (copolymers comprising TFE, HFP and E), TFE-E (copolymers of TFE and E), TFE-P (copolymers of TFE and P), PVDF (homopolymers of VDF).

Melt-processable thermoplastic fluoropolymers have been used in the preparation of extruded articles like sheets, layers, tubes etc. or in extrusion coatings like for example in the cable and wire industry. Thermoplastic fluoropolymers typically are melt-extrudable. Melt-extrudable polymers have a melting point, which means they are substantially crystalline materials. During melt-processing of thermoplastic fluoropolymers various melt defects can occur. For example, in extrusion processes the rate of extrusion of a fluorothermoplast is limited to the speed (known as critical shear rate) at which the polymer melt undergoes melt fracture. Melt fracture leads to an undesired rough surface of the extruded article (also referred to in the art as "shark skin"). Therefore, the critical shear rate of thermoplasts is typically determined and indicated in the supplier's data sheets. These defects typically occur only on the surface of the polymer and may be predominantly or exclusively caused by the melt-processing equipment or the condition at which the melt-processing is carried out. Various means are available to increase the critical shear rate of a thermoplast to allow for faster melt-processing rates, which is economically advantageous. One example is the use of additives (processing aids). Other attempts have relied on broadening the molecular weight distribution of the polymers or on using bimodal or multimodal polymer compositions, i.e. polymer compositions with distinct populations of polymers having distinctively different molecular weights. Alternatively, modifying the polymer architecture may also improve the melt-processing of the respective fluorothermoplast. For example, in WO2009/009361, the introduction of long chain branches to substantially linear polymers has been described to lead to improved melt processing and melt processed products, for example films and tubes having more homogeneous surfaces.

Other defects may be present in extruded products that are not (only) surface defects. Such "internal" defects may be caused by polymer fractions within the polymer composition that are believed to form gels during melt processing rather than melt. Such fractions are believed to be polymer coagulates created during the polymerization reaction. Typically these defects appear as substantially spherical, circular or oval inhomogeneities in the extruded product and are referred to in the art as "bubbles" or "fish eyes" or simply as "gel content". Polymers with high gel content will lead to extrusion products of poor visual appearance, either caused by defects in the extruded polymer or by leading to inhomogeneous distribution of adjuvants likes pigments or fillers in the extrusion product.

Thermoplastic TFE-based fluoropolymers are believed to be prone to have an increased "gel content" with increasing melting points. However, higher melting fluoropolymers are desired in many applications as they allow for higher service temperatures and greater processing windows. For example, high processing temperatures may be required in lamination processes of fluoropolymer sheets to form multi-layer articles or during encapsulation processes using high melting encapsulants to form sealed fluoropolymer products as are often required, for example, in the manufacture of solar modules.

Therefore, there is a need for thermoplastic fluoropolymers, and in particular melt-processed fluoropolymers, having high melting points, for example melting points of at least 170° C. that can be conveniently melt-processed, e.g. melt-extruded, and that can be extruded into films having an increased visual appearance, for example by having a reduced gel content.

SUMMARY

In one aspect of the present disclosure there is provided a tetrafluoroethene-based fluoropolymer, having an MFI (265/5) of from about 13 to about 30 g/10 min, a melting point of from about 170° C. to about 230° C., wherein the tetrafluoroethene-based fluoropolymer is a copolymer comprising more than 52% by weight based on the weight of the polymer of units derived from tetrafluoroethene and is selected from copolymers comprising interpolymerized units of tetrafluoroethene and ethene or interpolymerized units of tetrafluoroethene and hexafluoropropene, wherein the tetrafluoroethene-based fluoropolymer is obtainable by a radical aqueous emulsion polymerization in the presence of one or more fluorinated emulsifiers of the general formula $$R_f\text{O-L-CO}_2^-X^+ \quad \text{(I)}$$

wherein Rf is selected from a partially or fully fluorinated alkyl group that may optionally be interrupted with one or more oxygen atoms; L is selected from a partially or fully fluorinated linear or branched alkylene group that is optionally interrupted with one or more oxygen atoms and $X^+$ represents a cation or $H^+$, and one or more fluorinated liquids selected from saturated partially or perfluorinated hydrocarbons which may contain one or more catenary heteroatoms selected from oxygen and/or nitrogen and have a boiling point of greater than 50° C.

In another aspect there is provided a tetrafluoroethene-based fluoropolymer, having an MFI (265/5) of from about 13 g/10 min to about 30 g/10 min and a melting point between 170° C. an 230° C., wherein the tetrafluoroethene-based polymer is a copolymer selected from copolymers comprising interpolymerized units of tetrafluoroethene and ethene or interpolymerized units of tetrafluoroethene and hexafluoropropene, wherein the copolymer comprises more than 52% by weight based on the weight of the copolymer of units derived from tetrafluoroethene and wherein the fluoropolymer has a gel content of less than 3,000/m².

In yet another aspect there is provided an extrusion product comprising a tetrafluoroethene-based fluoropolymer, having an MFI (265/5) of from about 13 g/10 min to about 30 g/10 min and a melting point between 170° C. an 230° C., wherein the tetrafluoroethene-based polymer is a copolymer selected from copolymers comprising interpolymerized units of tetrafluoroethene and ethene or interpolymerized units of tetrafluoroethene and hexafluoropropene, wherein the fluoropolymer comprises more than 52% by weight based on the weight of the polymer of units derived from tetrafluoroethene and has a gel content of less than 3,000/m².

In a further aspect there is provided a multi-layer article comprising an extruded sheet comprising a tetrafluoroethene-based fluoropolymer, having an MFI (265/5) of from about 13 g/10 min to about 30 g/10 min and a melting point between 170° C. an 230° C., wherein the tetrafluoroethene-based fluoropolymer is a copolymer comprising more than 52% by weight based on the weight of the polymer of units derived from tetrafluoroethene and is selected from copolymers comprising interpolymerized units of tetrafluoroethene and ethene or interpolymerized units of tetrafluoroethene, and hexafluoropropene and wherein the fluoropolymer has a gel content of less than 3,000/m².

In yet another aspect there is provided a process of making an extruded article comprising providing (i) a composition comprising a tetrafluoroethene-based fluoropolymer, having an MFI (265/5) of from about 13 to about 30 g/10 min, a melting point of from about 170° C. to about 230° C., wherein the tetrafluoroethene-based fluoropolymer is a copolymer comprising more than 52% by weight based on the weight of the polymer of units derived from tetrafluoroethene and is selected from copolymers comprising interpolymerized units of tetrafluoroethene and ethene or interpolymerized units of tetrafluoroethene and hexafluoropropene, wherein the tetrafluoroethene-based fluoropolymer is obtainable by a radical aqueous emulsion polymerization in the presence of one or more fluorinated emulsifiers of the general formula $$R_fO\text{-}L\text{-}CO_2^-X^+ \qquad (I)$$

wherein Rf is selected from a partially or fully fluorinated alkyl group that may optionally be interrupted with one or more oxygen atoms; L is selected from a partially or fully fluorinated linear or branched alkylene group that is optionally interrupted with one or more oxygen atoms, and $X^+$ represents a cation or $H^+$, and one or more fluorinated liquids selected from saturated partially or perfluorinated hydrocarbons which may contain one or more catenary heteroatoms selected from oxygen and/or nitrogen and having a boiling point of greater than 50° C., and (ii) subjecting the composition to melt-extrusion to obtain an extruded article.

In a further aspect there is provided a process of making an extruded article comprising providing (i) a composition comprising a tetrafluoroethene-based fluoropolymer having an MFI (265/5) of from about 13 g/10 min to about 30 g/10 min and a melting point between 170° C. an 230° C., wherein the tetrafluoroethene-based fluoropolymer comprises interpolymerized units of tetrafluoroethene and ethene or interpolymerized units of tetrafluoroethene and hexafluoropropene, and comprises more than 52% by weight, based on the weight of the fluoropolymer, of units derived from tetrafluoroethene and wherein the fluoropolymer has a gel content of less than 3,000/m² and (ii) subjecting the composition to melt-extrusion to obtain an extruded article.

In a further aspect of the present disclosure there is provided a method of making a tetrafluoroethene-based fluoropolymer, having an MFI (265/5) of from about 13 g/10 min to about 30 g/10 min and a melting point between 170° C. an 230° C., wherein the tetrafluoroethene-based fluoropolymer comprises interpolymerized units of tetrafluoroethene and ethene or interpolymerized units of tetrafluoroethene and hexafluoropropene, and comprises more than 52% by weight, based on the weight of the fluoropolymer, of the units derived from tetrafluoroethene and wherein the fluoropolymer has a gel content of less than 3,000/m², said method comprising polymerizing the monomers making up the fluoropolymer in an aqueous emulsion polymerization using the fluorinated emulsifier according to the formula (I)

$$R_fO\text{-}L\text{-}CO_2^-X^+ \qquad (I)$$

wherein Rf is selected from a partially or fully fluorinated alkyl group that may optionally be interrupted with one or more oxygen atoms; L is selected from a partially or fully fluorinated linear or branched alkylene group that is optionally interrupted with one or more oxygen atoms, and $X^+$ represents a cation or $H^+$, and in the presence of one or more fluorinated liquids selected from saturated partially or perfluorinated hydrocarbons which may contain one or more catenary heteroatoms selected from oxygen and/or nitrogen and having a boiling point of greater than 50° C.

Other features and advantages of the invention will be apparent from the following detailed description of the invention and the claims. The above summary of principles of the disclosure is not intended to describe each illustrated embodiment or every implementation of the present disclosure. The following details more particularly exemplify certain preferred embodiments utilizing the principles disclosed herein.

DETAILED DESCRIPTION

Fluoropolymers

The fluoropolymers according to the present description are TFE-based copolymers. This means they contain at least 52% by weight based on the weight of the total polymer of units derived from tetrafluoroethene (TFE). The fluoropolymers are partially fluorinated, which means they contain at least one partially fluorinated comonomer and/or at least one non-fluorinated comonomer. The term "copolymer" in connection with the present invention should generally be understood to mean a polymer comprising repeating units derived from the recited monomers without excluding the option of other further repeating units being present that derive from other monomers not explicitly recited. Accordingly, for example the term "copolymer of monomers A and B" includes binary polymers of A and B as well as polymers that have further monomers other than A and B, such as terpolymers and quadpolymers. The copolymers are made up by the units derived from their monomers. i.e. interpolymerized units of these monomers. For example, a TFE-E copolymer is prepared by copolymerizing the monomers TFE and E and thus contains units derived from TFE and E, i.e. interpolymerized units of TFE and E. Examples of suitable TFE-based polymers include copolymers comprising TFE and ethene (TFE-E), TFE, HFP and ethene (HTE), TFE, HFP and VDF (THV).

TFE-E copolymers may comprise from about 10 to about 30% by weight of units derived from ethene with the remainder being units derived from TFE and optionally one or more further comonomers as described below with the proviso that the amount of units derived from TFE is at least 52% by weight.

HTE copolymers may comprise from about 10 to about 30% by weight of units derived from hexafluoropropene and from about 5 to about 20% by weight of ethene with the remainder being units derived from TFE and optionally one or more further comonomers as described below with the proviso that the amount of units derived from TFE is at least 52% by weight.

THV copolymers may comprise from about 10% up to about 40% by weight of units derived from vinylidenefluoride, from about 10 to about 40% by weight of units derived from hexafluoropropene and from 0 to about 10% by weight of further comonomers as described herein below with the proviso that the amount of units derived from TFE is at least 52% by weight.

The above-described copolymers may or may not contain one or more further comonomers. Such further comonomers preferably are fluorinated olefins, more preferably fluorinated or perfluorinated alpha-olefins, i.e. olefins with a terminal C—C double bond. Such further comonomers include but are not limited to trichlorofluoroethene (CTFE), perfluoro vinyl or allyl ethers corresponding to the formula: $CF_2=CF-(CF_2)_n-O-Rf$ wherein n is 1 or 0 and Rf represents a perfluorinated aliphatic group that may contain one or more oxygen atoms. Specific examples of perfluorinated alkyl vinyl ethers include perfluoro methyl vinyl ether (PMVE), perfluoro ethyl vinyl ether (PEVE), and perfluoro n-propyl vinyl ether (PPVE-I). Specific examples of perfluorinated alkoxy vinyl ethers include perfluoro-2-propoxypropylvinyl ether (PPVE-2), perfluoro-3-methoxy-n-propylvinyl ether (MV-31), perfluoro-2-methoxy-ethylvinyl ether and $CF_3-(CF_2)_2-O-CF(CF_3)-CF_2-O-CF(CF_3)-CF_2-O-CF=CF_2$(PPVE-3). Some of the aforementioned perfluoro vinyl ethers will be liquid under the conditions of polymerization and are thus non-gaseous fluorinated monomers. Typically, the co-monomers, however, do not contain more than 14, preferably no more than 11, most preferably not more than 8 carbon atoms.

The TFE-based copolymers according to the present description are melt-processable. In connection with the present description, a fluoropolymer is considered to be melt-processable if the melt viscosity of the polymer is low enough such that the polymer can be processed in conventional extrusion equipment used to extrude polymers. Therefore, melt-processable fluoropolymers typically have a melt flow index (MFI) at 265° C. and a 5 kg load ("MFI 265/5") of at least 1 g/10 min. This typically corresponds to a melt viscosity at the processing temperature (e.g. 250 to 400° C.) of no more than $10^6$ Pa*s, preferably $10^2$ to $10^5$ Pa*s. The copolymers according to this description have a melt flow index (MFI) at 265° C. and a 5 kg load ("MFI 265/5") of from about 13 to about 30 g/10 min, preferably from about 13 to about 17 g/10 min. The MFI can be determined, for example, according to ASTM D-1238.

The TFE-based copolymers according to the present description have a melting point of at least about 170° C. Typically, they have a melting point within the temperature interval of from about 170° C. up to about 230° C.

Typically, the molecular weight distribution (MWD) of the TFE-based copolymers according to the present description is relatively narrow (typically Mw/Mn is from 1.4 to 2.0 or from 1.5 to 1.9) compared to other technical polymers where the Mw/Mn ratio is about 2.5. The MWD can be determined experimentally, for example by the methods described herein. The MWD can be theoretically predicted according to Hintzer and Loehr, in Modern Fluoropolymers, John Scheirs (editor), John Wiley & Sons, 1997, pages 229 to 230.

The fluoropolymers according to the present description do not have so-called long chain branches or only insignificantly amounts thereof. That is, the polymers are linear or substantially linear, in that only branches are present that are introduced to the polymer backbone by the monomers used. Long chain branches are introduced into the backbone by using specific branching modifiers in the polymerization. Such modifiers are either bisolefins and/or monoolefins containing iodine and/or bromine atoms. Without intending to be bound by theory, it is believed that long chain branches result from abstraction of the bromine or iodine atom from the modifier once it is polymerized into the backbone of the fluoropolymer. The so-produced radical on the backbone may then cause further polymerization with the result that a polymeric chain is formed as a branch on the backbone. Such branches are known in the art as long chain branches or 'LCB's'.

Therefore, the fluoropolymers according to the present description are available by a polymerization carried out essentially in absence of any branching modifiers. This means no branching modifiers are present or they are only present in insignificant amount, i.e. in amounts of up to about 0.01% by weight based on total amount of polymer to be produced.

Branching modifiers include polyolefins or bisolefins or olefins that have on at least one carbon of the double bond a bromine or iodine atom. The olefin may, apart from containing Br and/or I atoms, be non-fluorinated, i.e. not contain fluorine atoms; may be partially fluorinated, i.e. some but not all hydrogen atoms have been replaced with fluorine atoms; or the olefin may be a perfluorinated compound in which all hydrogen atoms have been replaced with fluorine atoms except for those replaced with I or Br. Branching modifiers can be represented by the general formula:

$$X_2C=CXZ$$

wherein each X may be the same or different and is selected from the group consisting of hydrogen, F, Cl, Br and I, with the proviso that at least one X represents Br or I, Z represents hydrogen, F, Cl, Br, I, a perfluoroalkyl group, a perfluoroalkoxy group or a perfluoropolyether group.

The level of branching can be determined by the Long Chain Branching Index (LCBI). The LCBI can be determined as described in R. N. Shroff, H. Mavridis; MacromoL, 32, 8464-8464 (1999) & 34, 7362-7367 (2001) according to the equation:

$$LCBI = \frac{n_{a,br}^{\frac{1}{a}}}{[n]_{br}} \cdot \frac{1}{k^{1/a}} - 1$$

and as described in international patent application WO2004/11124 to Amos at al.

The LCBI of substantially linear fluoropolymers is less than 0.2. Therefore, the fluoropolymers according to the present description have an LCBI of less than 0.2.

If a fluoropolymer is insoluble in any organic solvent, the level of branching or non-linearity can alternatively be characterized through the relaxation exponent n (also referred to as "critical relaxation exponent"). As disclosed in WO 2004/094491, the critical relaxation exponent n of a substantially linear fluoropolymer is greater than 0.90. The lower the exponent, the more branches are present.

To generate long chain branches the amount of the modifier needed will be from 0.01% by weight, or even from 0.05% and up to 0.25% by weight, even up to 0.4% by weight, or higher based on the total weight of polymer to be produced. Amounts of modifier lower than 0.01% by weight may not be detrimental in the polymerization if substantially linear polymers are to be prepared but, preferably, no modifier is used at all.

The fluoropolymers described herein can be made through an aqueous emulsion polymerization process in the presence of a fluorinated liquid as described, for example, in US patent application No. 2004/0072977 to Kaulbach and Mayer, incorporated herein by reference, but with using the fluorinated liquids and fluorinated polyether surfactants as described herein. As shown in the example section provided herein it has been found that TFE-based fluoropolymers having high melting points made with perfluorinated acids as emulsifiers have an increased gel content. Without being bound by theory it is believed that the combination of the emulsifiers described herein and the fluorinated liquids described herein used in the polymerization allows for the production of high melting, melt-processable TFE-based polymers of narrow molecular weight distribution with reduced formation of coagulates during the polymerization. It is believed that this reduced amount of coagulates formed during the polymerization and (incorporated into the isolated polymer) may play an important role in the improved optical quality, e.g. the low gel content, of the fluoropolymers according to this description. The fluoropolymers according to the present disclosure typically have a gel content of less than 3,000/m² (three thousands/m²), preferably less than 1,500/m² (one thousand five hundred/m²), most preferably less than 800/m² (eighthundred/m²). The gel content can be determined by extruding the polymer into a 100 μm thick sheet. The polymers are transparent or opaque at such thickness and internal defects are visible to the naked eye and can be counted to determine the gel content.

For aqueous emulsion polymerization, the reactor vessel for use in the aqueous emulsion polymerization process is typically a pressurizable vessel capable of withstanding the internal pressures during the polymerization reaction. Typically, the reaction vessel will include at least one mechanical agitator, which will produce thorough mixing of the reactor contents and heat exchange system. Any quantity of the fluoromonomer(s) may be charged to the reactor vessel. The monomers may be charged batch-wise or in a continuous or semi-continuous manner. The independent rate at which the monomers are added to the kettle will depend on the consumption rate of the particular monomer with time. Preferably, the rate of addition of monomer will equal the rate of consumption of monomer, i.e. conversion of monomer into polymer. The aqueous emulsion polymerization reaction kettle may be charged with water, the amounts of which are not critical, to provide an aqueous phase. To the aqueous phase is generally also added the fluorinated polyether surfactant described below. At least a part of the fluorinated polyether surfactants is added to the reaction mixture as an aqueous mixture with at least one fluorinated liquid as described below.

Fluorinated Polyether Surfactants

The fluorinated surfactant is typically used in amounts of about 0.01% by weight to about 1% by weight based on the aqueous phase of the polymerization system. Fluorinated polyether surfactants include those according to general formula:

$$R_fO\text{-}L\text{-}CO_2^-X^+ \qquad (I)$$

wherein Rf is selected from a partially fluorinated alkyl group, a fully fluorinated alkyl group, a partially fluorinated alkyl group that is interrupted with one or more oxygen atoms, and a fully fluorinated alkyl group that is interrupted with one or more oxygen atoms, wherein $R_f$ may be linear or branched; L is selected from a partially fluorinated alkylene group, a fully fluorinated alkylene group, a partially fluorinated alkylene group that is interrupted with one or more oxygen atoms, and a fully fluorinated alkylene group that is interrupted with one or more oxygen atoms; $X^+$ represents a cation or $H^+$. L may be branched but preferably L is linear. More preferably, both L and Rf are linear. Preferably either Rf or L or both contain a partially fluorinated group. Fully fluorinated or perfluorinated) alkylene groups include alkylene groups that consist of only carbon and fluorine atoms whereas partially fluorinated alkylene groups may additionally contain hydrogen. Generally, a partially fluorinated alkylene group should not contain more than 2 hydrogen atoms so as to be highly fluorinated and non-telogenic or at least have minimal telogenic effects. Examples of L include fully fluorinated alkylene groups, like linear perfluorinated alkylene that have from 1 to 6 carbon atoms, for example linear perfluorinated alkylene groups of 1, 2, 3, 4 or 5 carbon atoms. Examples of linear partially fluorinated alkylene groups include those that have from 1 to 6 carbon atoms. In a particular embodiment the linear partially fluorinated alkylene linking group L has 1, 2, 3, 4, 5 or 6 carbon atoms and has only 1 or 2 hydrogen atoms. When the partially fluorinated alkylene group has 2 hydrogen atoms, the hydrogen atoms may be attached to the same carbon atom or they can be attached to different carbon atoms. When they are attached to different carbon atoms, such carbon atoms can be adjacent to each other or not. Also, in a particular embodiment, a carbon atom having 1 or 2 hydrogen atoms may be adjacent the ether oxygen atom to which the linking group is attached or adjacent the carboxylic group to which the linking group is attached at its other end. Particular examples of linking groups L may be selected from the following:

—$(CF_2)_g$— wherein g is 1, 2, 3, 4, 5 or 6;
—$CFH$—$(CF_2)_h$— wherein h is 0, 1, 2, 3, 4 or 5;

—$CF_2$—CFH—$(CF_2)_d$— wherein d is 0, 1, 2, 3 or 4;
—$CH_2$—$(CF_2)_h$— wherein h is 1, 2, 3 or 4;
—$(CH_2)_c$— wherein c is 1, 2, 3 or 4.

In the above examples, the left side of the formula of the linking group is the site where the linking group is connected to an ether oxygen in formula (I). Preferably Rf is perfluorinated when L is partially fluorinated and vice versa.

The Rf group in formula (I) represents a partially fluorinated alkyl group, a fully fluorinated alkyl group, a partially fluorinated alkyl group that is interrupted with one or more oxygen atoms, and a fully fluorinated alkyl group that is interrupted with one or more oxygen atoms. In one embodiment, Rf is a linear perfluorinated aliphatic group having 1 to 6 carbon atoms, preferably having 1, 2, 3 or 4 carbon atoms. According to another embodiment Rf is a linear perfluorinated aliphatic group interrupted with one or more oxygen atoms of which the alkylene groups between oxygen atoms have not more than 4 or 6 carbon atoms, for example 3 or less carbon atoms and wherein the terminal alkyl group has not more than 4 or 6 carbon atoms, for example 3 or less carbon atoms.

According to a further embodiment, Rf is a linear partially fluorinated aliphatic group having 1 to 6 carbon atoms and not more than 2 hydrogen atoms or a linear partially fluorinated aliphatic group interrupted with one or more oxygen atoms and which has not more than 2 hydrogen atoms. In the latter embodiment, it will generally be preferred that any perfluorinated alkylene moiety has not more than 4 or 6 carbon atoms and any terminal perfluorinated alkyl group likewise preferably should not have more than 6 carbon atoms, for example not more than 4 carbon atoms. A particular example of a partially fluorinated aliphatic group Rf is $CF_3CFH$—.

The anion part of formula (I) shall have a molecular weight of less than 1,500 g/mole, preferably less than 998 g/mole.

Specific examples of compounds according to formula (I) include, but are not limited to, the following: a) Rf—O—CHF—COOX; b) Rf—O—CHF—$CF_2$—COOX; c) Rf—O—$CF_2$—CHFCOOX; d) Rf—O—$CF_2$—CHF—$CF_2$COOX; e) Rf—(O)m-CHF—$CF_2$—O—$(CH_2)$n-COOX n=1, 2 or 3; m=0 or 1; f) Rf—O—$((CF_2)_n$—O$)_m$—$CH_2$—COOX n=1, 2, or 3; m=0, 1, 2; g) Rf—O—$(CF_2)$O—COOX (wherein Rf is partially fluorinated). X has the meaning as described above. Specific examples include, but are not limited to:

a) Rf—O—CHF—COOX:
$C_3F_7$—O—CHF—COOX
$CF_3$—O—$CF_2CF_2$—$CF_2$—O—CHF—COOX
$CF_3CF_2CF_2$—O—$CF_2CF_2$—$CF_2$—O—CHF—COOX
$CF_3$—O—$CF_2$—$CF_2$—O—CHF—COOX
$CF_3$—O—$CF_2$—O—$CF_2$—$CF_2$—O—CHF—COOX
$CF_3$—$(OCF_2)_2$—O—$CF_2$—$CF_2$—O—CHF—COOX
$CF_3$—$(OCF_2)_3$—O—$CF_2$—$CF_2$—O—CHF—COOX b) Rf—O—CHF—$CF_2$—COOX:
$CF_3$—O—CHF—$CF_2$—COOX
$CF_3$—O—$CF_2CF_2$—O—CHF—$CF_2$—COOX
$CF_3$—$CF_2$—O—CHF—$CF_2$—COOX
$CF_3$—O—$CF_2CF_2$—$CF_2$—O—CHF—$CF_2$—COOX
$CF_3$—O—$CF_2$—O—$CF_2CF_2$—O—CHF—$CF_2$—COOX
$CF_3$—$(OCF_2)_2$—O—$CF_2CF_2$—O—CHF—$CF_2$—COOX
$CF_3$—$(OCF_2)_3$—O—$CF_2CF_2$—O—CHF—$CF_2$—COOX c) Rf—O—$CF_2$—CHFCOOX:
$CF_3$—O—$CF_2$—CHF—COOX
$C_3F_7$—O—$CF_2$—CHF—COOX
$CF_3$—O—$CF_2CF_2$—$CF_2$—O—$CF_2$—CHF—COOX
$CF_3$—O—$CF_2$—O—$CF_2CF_2$—O—$CF_2$—CHF—COOX
$CF_3$—$(OCF_2)_2$—O—$CF_2CF_2$—O—$CF_2$—CHF—COOX
$CF_3$—$(OCF_2)_3$—O—$CF_2CF_2$—O—$CF_2$—CHF—COOX d) Rf—O—$CF_2$—CHF—$CF_2$COOX:
$CF_3$—O—$CF_2$—CHF—$CF_2$—COOX
$C_2F_5$—O—$CF_2$—CHF—$CF_2$—COOX
$C_3F_7$—O—$CF_2$—CHF—$CF_2$—COOX
$CF_3O$—$CF_2CF_2CF_2$—O—$CF_2$—CHF—$CF_2$—COOX
$CF_3$—O—$CF_2$—O—$CF_2CF_2$—O—$CF_2$—CHF—$CF_2$—COOX
$CF_3$—$(OCF_2)_2$—O—$CF_2CF_2$—O—$CF_2$—CHF—$CF_2$—COOX
$CF_3$—$(OCF_2)_3$—O—$CF_2CF_2$—O—$CF_2$—CHF—$CF_2$—COOX e) Rf—(O)m-CHF—$CF_2$—O—$(CH_2)$n-COOX n=1, 2 or 3; m=0 or 1
$CF_3$—O—CHF—$CF_2$—O—$CH_2$—COOX
$CF_3$—O—$CF_2CF_2CF_2$—O—CHF—$CF_2$—O—$CH_2$—COOX
$C_3F_7$—O—CHF—$CF_2$—O—$CH_2$—COOX
$C_3F_7$—O—CHF—$CF_2$—O—$CH_2CH_2$—COOX
$C_3F_7$—O—$CF_2CF_2$—O—CHF—$CF_2$—$OCH_2$—COOX
$C_3F_7$—O—$CF_2$—$CF_2$—$CF_2$—O—CHF—$CF_2$—$OCH_2$—COOX
$C_3F_7$—O—$CF_2$—CHF—$CF_2$—$OCH_2$—COOX
$CF_3$—CHF—$CF_2$—O—$CH_2$—COOX
$C_3F_7$—$CF_2$—CHF—$CF_2$—$OCH_2$—COOX f) Rf—O—$((CF_2)_n$—O$)_m$—$CH_2$—COOX n=1, 2, or 3; m=1, 2
$CF_3$—O—$CF_2CF_2$—O—$CH_2$—COOX
$CF_3$—O—$CF_2CF_2CF_2$—O—$CF_2CF_2$—O—$CH_2$—COOX
$C_3F_7$—O—$CF_2CF_2$—O—$CH_2$—COOX
$C_3F_7$—O—$CF_2CF_2$—O—$CF_2CF_2$—$OCH_2$—COOX
$C_3F_7$—O—$CF_2CF_2CF_2$—O—$CF_2CF_2$—$OCH_2$—COOX
$C_3F_7$—O—$CF_2CF_2CF_2$—$OCH_2$—COOX
$C_4F_9$—O—$CH_2$—COOX
$C_3F_7$—O—$CH_2$—COOX
$C_6F_{13}$—$OCH_2$—COOX g) Rf—O—$(CF_2)$O—COOX (wherein Rf is partially fluorinated like but not limited to):
$CF_1$CHF—O—$(CF_2)$O—COOX:
$CF_3$CFH—O—$(CF_2)_3$—COOX
$CF_3$CFH—O—$(CF_2)_5$—COOX
$CF_3$CFH—O—$(CF_2)$O—COOX
$CF_3$CFH—O—$(CF_2)_3$—COOX
$CF_3$CFH—O—$(CF_2)_5$—COOX These surfactants and her preparation have been described, for example, in US2008/0015304 to Hintzer et al., incorporated herein by reference. The surfactants are also commercially available from Anles Ltd, St. Petersburg, Russia.

It is understood that while the description of compounds in the present application may reference only the acid form or only the salt form of a certain species, the corresponding acids and salts, in particular the $NH^{4+}$, potassium, sodium or lithium salts, can equally be used.

Inert Fluorinated Liquids

The inert fluorinated liquid may for instance, be selected from aliphatic and aromatic fluorinated ethers or polyethers that optionally may have (but preferably have not sulfur and/or nitrogen atoms. The fluorinated liquid typically will have a boiling point of at least 30° C., at least 50° C. at least 100° C., or even at least 150° C., for example between 150° C. and 230° C. Fluorinated liquids with boiling points above 230° C. are also contemplated. For instance, fluorinated liquids may have boiling points up to 250° C., up to 300° C., even up to 350° C.

The fluorinated liquid preferably is a partially fluorinated liquid. Preferably, the partially fluorinated liquid contains only one or two or three hydrogen atoms. It is preferred, however, that a partially fluorinated liquid does not act as a chain transfer agent in the aqueous phase. Chain transfer agents are non-radical species that react with a radical species. This may involve, for instance, a chain transfer agent reacting with an actively polymerizing chain. The result of this reaction is at least one different radical species. After this happens, the polymerizing chain is terminated. A new chain may or may not start, depending on the reactivity of the new radical species. In many cases, the result is a diminution of the molecular weight of the resulting polymer compared with a polymer prepared under the same conditions except that the chain transfer agent is not present. This diminution of molecular weight often takes place without a change in the overall rate of conversion of monomer to polymer. Therefore, it is possible to determine whether a fluorinated liquid is acting as a chain transfer agent in the aqueous phase by observing the molecular weight of the resulting polymer with and without the fluorinated liquid. If the molecular weight is significantly decreased with the addition of the fluorinated liquid (e.g., by 10% or more, by 20% or more, or even by 30% or more), then the fluorinated liquid is acting as a chain transfer agent in the aqueous phase. Particular embodiments of fluorinated liquids include those selected from fluorinated polyethers of the formula:

$$Rf-X-O-Rf1 \quad (II)$$

wherein Rf is selected from partially fluorinated, preferably perfluorinated, alkyl groups having from 1 to 4 carbon atoms, and n is from 1 to 10; X is an alkylene oxy or polyoxyalkylene unit having from 1 to 10 carbon atoms; Rf1 is selected from $CH_3$, or a partially fluorinated or perfluorinated alkyl group having from 1 to 10 carbon atoms. Preferably, the ether is partially fluorinated and either Rf or Rf1 or both are partially fluorinated. Specific examples include compounds according to the general formula:

$$Rf'-[OC_3F_6]n-O-CHFCF_3 \quad (III)$$

wherein Rf' is selected from or partially fluorinated, preferably a perfluorinated, alkyl group having from 1 to 4 carbon atoms, and n is from 1 to 10; and $$Rf''-O-CFH-CF_2-O-R \quad (IV)$$

wherein Rf" may be selected from a perfluorinated alkyl group having from 1 to 10 carbon atoms and R may be selected from $CH_3$, and Rf", wherein when R is Rf", it may be the same or different than the other Rf".

Particular embodiments according to formula (II) include perfluoropolyethers of formula:

$$Rf''-(OCF_2)x-(OCF_2CF_2)y-(CF(CF_3)-CF_2)z-(OCF(CF_3))a-Q \quad (IIa).$$

In formula (IIa) Rf" is selected from partially or perfluorinated alkyl groups having from 1 to 10 carbon atoms; Q is selected from Rf" and Rf"—$(OCF_2)x$-$(OCF_2CF_2)y$-$(CF(CF_3)$—$CF_2)z$-$(OCF(CF_3))a$; each x, y, z, and a is independently selected from 0 to 10, with the proviso that the sum of x+y+z+a is at least 1.

In yet other embodiments, fluorinated liquids include perfluorinated hydrocarbons such as, for instance, perfluorinated saturated aliphatic compounds such as a perfluorinated alkanes; perfluorinated aromatic compounds such as perfluorinated benzene, or perfluorinated tetradecahydrophenanthene. Perfluorinated liquids also include perfluorinated alkyl amines such as a perfluorinated trialkyl amine. Furthermore, the perfluorinated liquid may be a perfluorinated cyclic aliphatic compounds, such as decalin, and preferably a heterocyclic aliphatic compound containing oxygen, nitrogen or sulfur in the ring, such as perfluorinated N-alkyl substituted morpholines or perfluoro-2-butyl tetrahydrofuran. Specific examples of perfluorinated hydrocarbons include perfluoro-2-butyltetrahydrofuran, perfluorodecalin, perfluoromethyldecalin, perfluoromethyldecalin, perfluoromethylcyclohexane, perfluoro(1,3-dimethylcyclohexane), perfluorodimethyldecahydronaphthalene, perfluoro(tetradecahydrophenanthrene), perfluorotetracosane, perfluorokerosenes, oligomers of poly(chlorotrifluoroethylene), perfluoro(trialkylamine) such as perfluoro(tripropylamine), perfluoro(tributylamine), or perfluoro(tripentylamine), and octafluorotoluene, hexafluorobenzene, and commercial fluorinated solvents, such as Fluorinert FC-75, FC-72, FC-84, FC-77, FC-40, FC-43, FC-70 or FC 5312 all available from 3M Company, Saint Paul, Minn. The fluorinated alkanes can be linear or branched, and typically have a carbon atom number between 3 and 20.

The total amount of fluorinated liquid may be not more than 1% by weight based on the weight of the aqueous phase. Typically, the fluorinated polyether surfactant is at least partially added to the polymerization medium as an aqueous mixture, preferably an emulsion or microemulsion, containing one or more fluorinated liquids as described above. Stable emulsions do not show phase separation within 8 hours after stirring has ceased. This mixture may contain a partial or the entire amount of fluorinated liquids used in the polymerization.

The gaseous or liquid fluorinated monomers are polymerized in the appropriate amounts and ratios to give the TFE-base copolymers described herein.

The polymerization is usually initiated after an initial charge of monomer by adding a radical initiator or initiator system to the aqueous phase. For example, peroxides can be used as free radical initiators. Specific examples of peroxide initiators include, hydrogen peroxide, diacylperoxides such as diacetylperoxide, dipropionylperoxide, dibutyrylperoxide, dibenzoylperoxide, benzoylacetylperoxide, digiutaric acid peroxide and dilaurylperoxide, and further water soluble per-acids and water soluble salts thereof such as e.g. ammonium, sodium or potassium salts. Examples of per-acids include peracetic acid. Esters of the peracid can be used as well and examples thereof include tertiary-butylperoxyacetate and tertiary-butylperoxypivalate. A further class of initiators that can be used are water soluble azo-compounds. Suitable redox systems for use as initiators include for example a combination of peroxodisulphate and hydrogen sulphite or disulphite, a combination of thiosulphate and peroxodisulphate or a combination of peroxodisulphate and hydrazine. Further initiators that can be used are ammonium-alkali- or earth alkali salts of persulfates, permanganic or manganic acid or manganic acids. The amount of initiator employed is typically between 0.003 and 2% by weight, preferably between 0.005 and 1% by weight based on the total weight of the polymerization mixture. The full amount of initiator may be added at the start of the polymerization or the initiator can be added to the polymerization in a continuous way during the polymerization until a conversion of 70 to 80% of the fed monomers is reached. One can also add part of the initiator at the start and the remainder in one or separate additional portions during the polymerization. Accelerators such as for example water-soluble salts of iron, copper and silver may also be added. During the initiation of the polymerization reaction, the sealed reactor kettle and its contents are conveniently pre-heated to the reaction temperature. Polymerization temperatures may be from 20° C., from 30° C., or even from 40° C. and may further be up to 100° C., up to 120° C., or even up to 150° C. The polymerization pressure may range, for instance, from 4 to 30 bar, in particular from 8 to 20 bar. The aqueous emulsion polymerization system may further comprise auxiliaries, such as buffers and complex-formers.

A chain transfer agent may be charged to the reaction kettle to control the molecular weight distribution. The chain transfer agent may be added, for example, prior to the initiation of the polymerization. Useful chain transfer agents include C2 to C10 hydrocarbons such as ethane, alcohols, ethers, esters including aliphatic carboxylic acid esters and malonic esters, ketones and halocarbons. Particularly useful chain transfer agents are dialkylethers such as dimethyl ether and methyl tertiary butyl ether. Further additions of chain transfer agent in a continuous or semi-continuous way during the polymerization may also be carried out. For example, a fluoropolymer having a bimodal molecular weight distribution is conveniently prepared by first polymerizing fluorinated monomer in the presence of an initial amount of chain transfer agent and then adding at a later point in the polymerization further chain transfer agent together with additional monomer.

The amount of polymer solids that can be obtained at the end of the polymerization is typically at least 10% by weight, or even at least 20% by weight, and up to 40% by weight, and even up to 45% by weight; and the average particle size of the resulting fluoropolymer is typically between 50 nm and 500 nm.

The dispersion may be purified to remove fluorinated surfactants by ion exchange as known in the art, for example as described in EP 1,155,055 A1.

The polymers can be isolated by coagulation, for example by physical coagulation (freezing), mechanical coagulation (increased shear force) or salt-induced coagulation as known in the art.

The fluoropolymers according to the present description can be processed by melt extrusion to create an extrusion product. Melt extrusion processes include feeding of the polymer in its molten form through a die. Typically, the geometry of the die determines the shape of the extruded product. Melt extrusion processes include for instance, melt spinning, wire and cable extrusion, blown film, hose extrusion, film extrusion, tube extrusion, and blow-molding of hollow bodies.

Typically, the extrusion product may be a melt pellet to convert the polymer into a form that is easier to transport and store. Melt pellets typically are granules obtained by melt extruding the polymer into a strand and cutting the strand into smaller pieces. Melt pellets are typically of cylindrical shape and typically have a diameter and/or a length of at least 0.5 cm. Typically, melt pellets may have diameter or a length of from about 0.2 to 10 cm or from about 1 to 5 cm.

The fluoropolymers according to the present description (including the fluoropolymers in the form of a melt pellet) are particularly suitable for film extrusion, for example in the preparation of sheets. Sheets are rectangular articles having a length and width and a thickness. The length is the greatest dimension of the sheet followed by its width and its thickness. The width and thickness of an extruded sheet is determined by the dimensions of the extrusion die. The fluoropolymers provided herein can be extruded by standard film extrusion equipment into a sheet. The extrusion product may be a single sheet or a multi-layer article, in which case the extrusion process may involve coextrusion of another fluoropolymer or a non fluorinated polymer. Extruded fluoropolymer films may have a thickness of from about 10 μm to about 3,000 μm or from about 30 μm to about 5,000 μm.

Prior to melt extrusion, in particular prior to film extrusion the fluoropolymers according to the present description may be blended with fillers or other additives to create a fluoropolymer composition. Such fluoropolymer compositions may contain the fluoropolymer as described herein, in any relative amount. For instance, the presence of fluoropolymer may be in at least 90% by weight based on the total weight of the composition, at least 50%, at least 20% by weight. Fluoropolymer compositions may contain additives, like for example, organic or inorganic fillers, such as carbon particles, hollow glass particles (for example available under the trade designation GLASS BUBBLES from 3M Company), solid glass particles, silica, clays; pigments (for example zinc oxide, zinc sulfide, titanium dioxide), reinforcing agents (for example fibers, like glass fibers or carbon fibers) and antioxidants, lubricants, acid scavengers and other know additives used in the art.

The term melt-extrusion product is used herein to denote both, the fluoropolymers and the fluoropolymer compositions according to the present description.

In some embodiments, the extrusion products described herein may be useful for backside films in photovoltaic modules, for frontside films for flexible photovoltaic modules, and/or for blown films for decorative applications, such as decorative films applied in the fuselage of aircraft, for films in architectural applications, for example on buildings or green houses. In a particular embodiments the fluoropolymers or fluoropolymer compositions may be melt extruded to form films, preferably films in a multilayer article, for example multilayer laminates. In case of multilayer productions, the fluoropolymers may be coextruded with one or more other polymers to form the multilayer article or laminated to another layer or attached to another layer by using an adhesive. Multilayer articles, for example multilayer films or laminates are constructions, which attempt to marry the properties of dissimilar materials in order to provide an improved performance. Such properties include barrier resistance to elements such as water, cut-through resistance, weathering resistance and/or electrical insulation. Multilayer laminates containing fluoropolymers may be used in pipes, tubings, or as protective sheets in solar modules, or green houses, windows or buildings. Such protective sheets, in particular in solar modules, are typically laminates and typically contain a fluoropolymer layer as an external layer and furthers layers of barrier materials such as, but not limited to PET (polyethylene terephalate), or may include metal foils or inorganic coatings to provide further functional features like vapor barriers, increased reflection of incoming light and thermal and electrical insulation. These backsheets may include multiple layers of fluoropolymers or non fluoropolymers. The conventional constructions typically require that the completed, typically multilayer, construction be subjected to a heating cycle prior to lamination so that the entire construction can be successfully laminated. An advantage of the fluoropolymers and their extrusion products provided herein is that they have a good optical appearance despite having a melting point of greater than 170° C. The high melting point allows for applying broader temperature profile in the lamination process. For example, partially fluorinated fluoropolymer sheets having melting points below 170° C. may soften during standard lamination processes used in the solar module industry, and may lead to undesired adhesion effects. Typically, the extrusion product comprising the fluoropolymers according to the present description forms an outer layer of the multi-layer article. The layer is typically an extruded or coextruded layer and has a thickness of from about 10 to 500 μm. Greater thicknesses can be also achieved, for example layers or sheets having a thickness of from about 20 or 50 µm to 1,000 µm or 5,000 µm. The fluoropolymer layer preferably has a tensile modulus of less than 99,000 psi, as defined in ASTM 0638. The noted tensile modulus is directed to achieving desired flexural characteristics in order to make the finished film structure pliable in its intended application. The multilayer article may typically include an intermediate layer. The intermediate layer having first and second outer layers bonded to opposing sides of the intermediate layer. Instead of a single intermediate layer also multiple, preferably adjacent or abutting intermediate layers may be used. The intermediate layer typically has a shrinkage rate of less than 1% at 150° C. when held for about 15 minutes. The multilayer film may contain a second outer layer. The intermediate layer typically contains an olefinic ester resin, typically a polyester. Polyesters capable of being processed into film form (for example having a thickness of 50 to 5,000 µm) may be suitable as an intermediate layer. These may include, but are not limited to, homopolymers and copolymers from the following families: polyesters, such as polyethylene terephthalates (PET), and ethylene vinylacetates (EVA). In alternative embodiment, the intermediate may include other polymers such, for example: polyacrylates; polyamides, such as polyamide 6, polyamide 11, polyamide 12, polyamide 46, polyamide 66, polyamide 69, polyamide 610, and polyamide 612; aromatic polyamides and polyphthalamides; thermoplastic polyimides; polyetherimides, polycarbonates, such as the polycarbonate of bisphenol A; acrylic and methacrylic polymers such as polymethyl methacrylate; chlorinated polymers, such as polyvinyl chloride and polyvinylidene chloride; polyketones, such as poly (aryl ether ether ketone) (PEEK) and the alternating copolymers of ethylene or propylene with carbon monoxide; polystyrenes of any tacticity, and ring- or chain-substituted polystyrenes; poly ethers, such as polyphenylene oxide, poly(dimethylphenylene oxide), polyethylene oxide and polyoxymethylene; cellulosics, such as the cellulose acetates; and sulfur-containing polymers such as polyphenylene sulfide, polysulfones, and polyethersulfones. A most preferred material is polyethyleneterephthalate.

The second outer layer may comprise a resin other than the fluoropolymers according to the present description. Preferably, such resins are olefinic polymers. Olefinic polymers useful in the composition of multi-layer articles include polymers and copolymers derived from one or more olefinic monomers of the general formula CH2=CHR", wherein R" is hydrogen or C1-18 alkyl. Examples of such olefinic monomers include propene, ethene, and 1-butene, with ethene being generally preferred. Representative examples of polyolefins derived from such olefinic monomers include polyethene (like but not limited to HDPE, LDPE, LLDPE, UHWPE), polypropene, polybutene-1, poly (3-methylbutene), poly(4-methylpentene) and copolymers of ethene with propene, 1-butene, 1-hexene, 1-octane, 1-decene, 4-methyl-1-pentene, and 1-octadecene.

The olefinic polymers may optionally comprise a copolymer derived from an olefinic monomer and one or more further comonomers that are copolymerizable with the olefinic monomer. These comonomers can be present in the polyolefin in an amount in the range from about 1 to 10 wt-% based on the total weight of the polyolefin. Useful such comonomers include, for example, vinyl ester monomers such as vinyl acetate, vinyl propionate, vinyl butyrate, vinyl chloroacetate, vinyl chloropropionate; acrylic and alpha-alkyl acrylic acid monomers, and their alkyl esters, amides, and nitriles such as acrylic acid, methacrylic acid, ethacrylic acid, methyl acrylate, ethyl acrylate, N,Ndimethyl acrylamide, methacrylamide, acrylonitrile; vinyl aryl Monomers such as styrene, o-methoxystyrene, p-methoxystyrene, and vinyl naphthalene; vinyl and vinylidene halide monomers such as vinyl chloride, vinylidene chloride, and vinylidene bromide; alkyl ester monomers of maleic and fumaric acid such as dimethyl maleate, and diethyl maleate; vinyl alkyl ether monomers such as vinyl methyl ether, vinyl ethyl ether, vinyl isobutyl ether, and 2-chloroethyl vinyl ether; vinyl pyridine monomers; N-vinyl carbazole monomers, and N-vinyl pyrrolidine monomers.

The second out layer may be an encapsulating layer. This means the layer comprises a resin that is cross-linkable. Cross-linking may be achieved thermally, or physically by which is meant irradiation treatment with $\alpha$-, $\beta$- or $\gamma$-beams, like but not limited to e-beam; or light, like for example IR or UV irradiation. Preferably the resin is flowable or melts at a temperature greater than 6° C. and below the melting point of the TFE-based fluoropolymer according to the present description. Suitable encapsulants include the olefinic polymers described above and in particular ethene vinyl acetates (EVA), polyethene (PE) and polypropene (PP) but also silicones.

The first and/or second outer layer and/or the intermediate layers may contain conventional adjuvants such as antioxidants, light stabilizers, acid neutralizers, fillers, antiblocking agents, pigments, primers and other adhesion promoting agents.

Optionally, one or more layers in a multilayer article may also include known adjuvants such as antioxidants, light stabilizers, conductive materials, carbon black, graphite, fillers, lubricants, pigments, plasticizers, processing aids, stabilizers, and the like including combinations of such materials. In addition, metallized coatings and reinforcing materials also may be used. These include, e.g., polymeric or fiberglass scrim that can be bonded, woven or non-woven. Such a material optionally may be used as a separate layer or included within a layer in a multi-layer embodiment according to the present disclosure.

To be most useful, the multilayer articles of the present disclosure should not delaminate during use. That is, the adhesive bond strength between the different layers of the multi-layer article should be sufficiently strong and stable so as to prevent the different layers from separating on exposure to, for example, moisture, heat, cold, wind, chemicals and or other environmental exposure. The adhesion may be required between non-fluoropolymer layers or adjacent the fluoropolymer layer. Various methods of increasing interlayer adhesion in all cases are generally known by those of skill in the art. The article of the invention may also include a bonding interface or agent between said outer and intermediate layers. A variety of methods have been employed to bond polymeric materials comprising a fluoropolymer to substantially non-fluorinated polymeric materials. For example, the layers can be adhesively bonded together by a layer of adhesive material between the two layers. Alternatively, surface treatment of one or both of the layers, used independently or in conjunction with adhesive materials, has been used to bond the two types of materials together. For example, layers comprising a fluoropolymer have been treated with a charged gaseous atmosphere followed by lamination with a layer of a non-fluorinated polymer. As another approach, "tie-layers" have been used to bond a fluoropolymer material to a layer of material comprising a substantially non-fluorinated polymer.

One specific surface treatment of a fluoropolymer for improving adhesion is disclosed in U.S. Pat. No. 6,630,047, herein incorporated by reference in its entirety. The specific surface treatment involves the use of actinic radiation, such as ultraviolet radiation in combination with a light-absorbing compound and an electron donor, in a preferred embodiment, one such tie layer method for improving interlayer adhesion with the fluoropolymer comprises blending a base and an aromatic material such as a catechol novolak resin, a catechol cresol novolak resin, a polyhydroxy aromatic resin (optionally with a phase transfer catalyst) with the fluoropolymer and then applying to either layer prior to bonding. Alternatively, this composition may be used as the fluoropolymer layer without separate tie layer as disclosed in U.S. Published Application No. 2005/0060210 A1, herein incorporated by reference in its entirety.

Another tie layer method for bonding fluoropolymers is the use of a combination of a base, a crown ether and a non-fluoropolymer. This method is disclosed in U.S. Pat. No. 6,767,948, herein incorporated by reference in its entirety.

Another method that may be used as a tie layer or as a primer for bonding fluoropolymers involves the use of an amino substituted organosilane. The method is fully disclosed in U.S. Pat. No. 6,753,087, herein incorporated by reference in its entirety. The organosilane may optionally be blended with a functionalized polymer. Adhesion between non-fluoropolymer layers may also be accomplished in a variety of ways including the application of anhydride or acid modified poly olefins, the application of silane primers, utilization of electron beam radiation, utilization of ultraviolet light and heat, or combinations thereof.

In a preferred embodiment, the intermediate layer and the second outer layer may be combined such as those commercially available as 3M™ Scotchpak™ Heat Sealable Polyester Films which include PET films combined with olefinic polymers such as polyester and ethylene vinyl acetate.

Those of ordinary skill in the art are capable of matching the appropriate the conventional bonding techniques to the selected multilayer materials to achieve the desired level of interlayer adhesion.

The multi-layer articles of the invention can be prepared by several different methods. For instance, one process for preparing a multilayer article featuring a fluoropolymer layer of the present description involves extruding one layer through a die to form a length of film. A second extruder supplies a die to coat another layer of molten polymer onto a surface of the first film. Additional layers can be added through similar means. Alternatively, the polymeric resins of two or more substituent layers may be co-extruded through a multi-manifold die to yield an intermediate or final product.

Those skilled in the art of coating technology are capable of selecting process equipment and processing conditions to address selected materials and thereby produce the desired muitilayer film.

Following the extrusion operations, the multi-layer article may be cooled, e.g., by immersion in a cooling bath. This process can be used to form multilayer sheets of the invention. In addition, the layers are preferably pressed together, such as through a nip or platen or other known means. Generally, increasing the time, temperature, and/or pressure can improve interlayer adhesion. The conditions for bonding any two layers can be optimized through routine experimentation.

Yet another useful method is to pre-form the individual film layers and then contact them in a process such as thermal lamination in order to form a finished article of the invention. The inter-layer adhesion promoting agents, if required, can be applied either sequentially, simultaneously or in-situ with any of the before described processes.

The intermediate layer, prior to application of the outer layers, should have a shrinkage rate of less than 1% at 150° C. when held for about 15 minutes, as previously indicated. In that regard, it may be necessary to pre-shrink the intermediate layer before the application of the other outer layers. Even then so, care must be taken with the addition of the outer layers such that inner layer is not overly tensioned or strained which can reintroduce shrinkage into the overall construction. Pre-shrinking of the film after the addition of other layers can become exceedingly difficult especially if one or more of the additional outer layers has a softening or melting point that is within the temperature range required to pre-shrink the intermediate layer.

The thickness of the individual layers within the multi-layer film can be varied and tailored per the end-use application requirements. In general though, the outer layer of fluoropolymer will be from about 15 to 80 µm, preferably 25 to 50 µm thick; the intermediate layer will be from about 25 to 260 µm, preferable 50 to 100 µm; and the outer poly olefin layer will be from 25 to 500 µm or greater, preferable it is 250 µm or greater.

The thickness of the overall construction is typically between 300 and 500 µm, and in a preferred embodiment, the thickness of the outer poly olefin layer is as thick, preferably twice as thick, or greater than the combined thickness of the intermediate and fluoropolymer layers. The multilayer film of the present disclosure is suitable for various end use applications. For example, the film may be utilized as a backing layer on solar cells structures. The use of the multilayer film in this manner results in a low cost, conformable, readily applied backing.

Various modifications and alterations of this disclosure will become apparent to those skilled in the art without departing from the scope and principles of this invention, and it should be understood that this invention is not to be unduly limited to the illustrative embodiments set forth hereinabove and hereinbelow.

Percentages as used herein are weight percentages unless specified otherwise and the total weight of the ingredients adds up to 100% weight. ASTM, DIN or other norms as referred to herein are used in the most actual version as of Jan. 1, 2012, In the following examples are provided to further illustrate the present disclosure without any intention to limit the disclosure to the specific examples provided.

In the following also a list of embodiments is provided to further illustrate the present disclosure without, however, any intention to limit the disclosure to the specific embodiments provided in this list. It is to be understood that the terms, formulae and definitions used in this list of embodiments are the same as used in the description and can be used interchangeably. Further details provided in the description with respect to a term or formula used in the list of specific embodiments can be used to further describe that term or formula.

EXAMPLES

Methods
Melt Flow Index
The melt flow index (MFI), reported in g/10 min, was measured according to ASTM D-1238 at a support weight of 5.0 kg. Unless otherwise noted, a temperature of 265° C. was applied and a standardized extrusion die of 2.1 mm diameter and 8.0 mm length was used.

Melting Point

Melting peaks of the fluoropolymers were determined according to ASTM 4591 by differential scanning calometry (DSC) (using a Perkin-Elmer DSC 7.0 from PerkinElmer Inc., Wellesley, Mass.) under nitrogen flow and a heating rate of 10° C./min. The indicated melting points relate to the melting peak maximum.

Processing Evaluation

Critical shear rates $\gamma^*_{crit}$, reported in reciprocal seconds ($s^{-1}$), were determined at 265° C. according to ASTM D-3835-96 (Standard Test Method for Determination of Properties of Polymeric Materials by Means of a Capillary Rheometer). A capillary rheometer model "Rheotester 1000" from GÖTTFERT Werkstoff-Prüfmaschinen GmbH (Buchen/Germany) was employed for testing. A variety of plunger speeds were used in ascending order (usually starting from 10 $s^{-1}$ and subsequently increasing by factor of 1.4). The melt was extruded through a capillary having the geometry of 1 mm diameter, 30 mm length and 90° entry angle. When constant flow conditions had been reached, which was monitored by a 500 bar pressure sensor, the extruded monofil was taken and visually inspected. The shear rate at which melt fracture was first visually detected was taken as the critical shear rate. The critical shear rate $\gamma^*_{crit}$ typically correlates with the MFI(265/5) according to the following equation:

$$\log [\gamma^*_{crit}] = 1.09 \times \log [MFI(265/5)] + 0.61$$

Gel Content

The gel content of the polymers can be determined by the number of defects visible to the naked eye after extruding the polymer into a thin film. The thin film is transparent or opaque and defects reflect or deflect the light and appear as (more) intransparent areas (typically as dark or black areas or spots). The number of such spots per $m^2$ of film gives the gel content of the polymer.

The gel content of the fluoropolymers was determined by imaging methods using a Pixargus Profilcontrol PSPM 500 from Pixargus GmbH, Wuerselen, Germany. The imaging software recorded the number of defects having a size (diameter or length or other longest dimension) of from 0.06 mm to 1.00 mm.

For determining the gel content the fluoropolymer was extruded (below its critical shear rate to exclude surface defects) into a film having a thickness of 100 μm and a width of 130 mm and a length of at least 7 m. The extruded film was placed onto the Pixargus Profilcontrol Scanner and 7 m of the film were scanned with the film moving through the Pixargus Profilcontrol Scanner at a speed of 4 m/min. The measurements from the first 2 meters of the film were discarded.

Polydispersity

Mw/Mn ratios were determined by oscillatory shear flow measurements conducted on fluoropolymer melts using a strain controlled ARES rheometer (3ARES-13; Firmware version 4.04.00) of TA Instruments New Castle, Del.) equipped with a FRT 200 transducer with a force range of up to 200 g. Dynamic mechanical data were recorded in nitrogen atmosphere in a first frequency sweep experiment at 265° C. using the parallel plate geometry with 25 mm diameter plates. The two plates usually had a distance of 1.8 mm from each other. The thermal control of the oven was operated using the sample/tool thermal element. With an applied strain of typically 5% it was made sure that the measurements were carried out in the linear regime (as appropriate, higher strains of up to 10% were applied, alternatively). The measurement frequency was varied in a descending order from 100 to 0.1 rad/s. A second frequency sweep experiment was run at a temperature lower than 266° C. but at least 25° C. higher than the melting peak maximum of the semi-fluorinated resin (typically 190° C. or 220° C.). The other experimental conditions were the same as above, with the exception that a strain of typically 2% was applied for the second frequency sweep. The dynamic mechanical data of the first and the second frequency sweep experiments were combined to a dynamic mechanical master curve using the time-temperature-superposition (TTS) tool of the orchestrator software (version 7.0.8.13). Two-dimensional least square fitting was applied and 265° C. was chosen as reference temperature. From this master curve, the point was determined using the orchestrator software, where the storage modulus G'(ω)) is equal to the loss modulus G"(ω). This point has the coordinates of the cross over modulus $G_c$ reported in Pa, and the cross over frequency, reported in red/s. The polydispersity ratios Mw/Mn reported herein were evaluated from the cross over modulus $G_c$ according to the equation:

$$Mw/Mn = 2.38 \times (10^5/G_c)^{0.76}$$

Comparative Example 1

A THV polymer was prepared by aqueous emulsion polymerization with perfluorooctanoic acid as emulsifier and no branching modifier according to the general teaching of example 1 of WO2009/009361. The polymer had a straight linear chain topography, an MFI (265/5) of 72 g/10 min, a melting point of 165° C., and Mw/Mn=1.55.

The isolated polymer was extruded into a film. The extrusion set-up comprised of a 30 mm single screw (screw length 750 mm) extruder (available from Ide GmbH & co. KG, Ostfildern, Germany), a 150 mm film die (available from Breyer, Wuelfrath, Germany) and a 3-roll stack (available from Collin GmbH, Ebersberg, Germany). The temperature profile in the extruder tested was 210° C., 240° C., 250° C. and 255° C. from Zone 1 to Zone 4, respectively. A filter pack of 1000/500/200 μm was employed. The die temperatures were all set at 250° C. The output was held constant at 6.2 kg for all experiments by employing a screw speed of 22 rpm. The 3-roll stack temperature was maintained at 80° C. and a separation between the die and 3-roll stack of 30 mm was held constant. The elongation line speed was varied between 3.6 m/min and 13 m/min. The film was extruded and wound up and samples were cut directly from the line to make measurements, such that the film was not folded, deformed or compromised in any manner. The extruded film was examined for its gel content according to the method described above. The film had a gel content of 4,250 (four thousand two hundred and fifty)/$m^2$.

Comparative Example 2

A THV polymer having a melting point of 189° C., an MFI (265/5) of 10.0 g/10 min and Mw/Mn of 1.86 was prepared by aqueous emulsion polymerization like in comparative example 1 but with 1.6 g diethylmalonate per kg of THV as chain transfer agent. The polymer was extruded into a film as described in comparative example 1 and had a gel content of 8,260 (eight thousand two hundred and sixty)/$m^2$.

Example 1

A linear THV polymer with a melting point of 188° C. Mw/Mn of 1.53 and an MFI (265/5) of 14.6 g/10 min was prepared according to the general teaching of example 10 of US Patent application No. 2004/0072977 to Kaulbach and Mayer by aqueous emulsion polymerization using a fluorinated polyether as described herein as fluorinated liquid and a fluorinated polyether surfactant as described herein as emulsifier. The polymer was extruded into a film as described in comparative example 1 and showed a gel content of 430/m².

LIST OF ILLUSTRATIVE EMBODIMENTS

1. A tetrafluoroethene-based fluoropolymer, having an MFI (265/5) of from about 13 g/10 min to about 30 g/10 min and a melting point between 170° C. an 230° C., wherein the tetrafluoroethene-based polymer is a copolymer selected from copolymers comprising interpolymerized units of tetrafluoroethene and ethene or interpolymerized units of tetrafluoroethene and hexafluoropropene, wherein the copolymer comprises more than 52% by weight based on the weight of the copolymer of units derived from tetrafluoroethene and wherein the fluoropolymer has a gel content of less than 3,000/m².

2. The tetrafluoroethene-based fluoropolymer of embodiment 1 having an Mw/Mn ratio of from about 1.4 up to 1.9.

3. The tetrafluoroethene-based fluoropolymer according to any one of embodiments 1 to 2 wherein the fluoropolymer is substantially linear.

4 The tetrafluoroethene-based fluoropolymer according to any one of embodiments 1 to 3 wherein the fluoropolymer is a TFE-E copolymer and comprises from about 10 to about 30% by weight of units derived from ethene with the remainder being units derived from TFE and optionally one or more further comonomers with the proviso that the amount of units derived from TFE is at least 52% by weight.

5. The tetrafluoroethene-based fluoropolymer according to any one of embodiments 1 to 3 wherein the fluoropolymer is an HTE copolymer and comprises from about 10 to about 30% by weight of units derived from hexafluoropropene and from about 5 to about 20% by weight of ethene with the remainder being units derived from TFE and optionally one or more further comonomers with the proviso that the amount of units derived from TFE is at least 52% by weight.

6. The tetrafluoroethene-based fluoropolymer according to any one of embodiments 1 to 3 wherein the fluoropolymer is a THV copolymer comprising from about 10% up to about 40% by weight of units derived from vinylidenefluoride, from about 10 to about 40% by weight of units derived from hexafluoropropene and from 0 to about 10% by weight of further comonomers with the proviso that the amount of units derived from TFE is at least 52% by weight.

7. The melt processable tetrafluoroethene-based fluoropolymer according to any one of the preceding embodiments, wherein the fluoropolymer is obtainable by a radical aqueous emulsion polymerization in the presence of one or more fluorinated emulsifiers of the general formula $$R_f\text{-O-L-CO}_2^-X^+ \tag{I}$$

wherein Rf is selected from a partially or fully fluorinated alkyl group that may optionally be interrupted with one or more oxygen atoms; L is selected from a partially or fully fluorinated linear or branched alkylene group that is optionally interrupted with one or more oxygen atoms, and $X^+$ represents a cation or $H^+$.

and one or more fluorinated liquids selected from saturated partially or perfluorinated hydrocarbons which may contain one or more catenary heteroatoms selected from oxygen and/or nitrogen and having a boiling point of greater than 50° C.

8. The tetrafluoroethene-based fluoropolymer according to embodiment 7 wherein L in formula (I) is linear.

9. The tetrafluoroethene-based fluoropolymer copolymer according to embodiments 7 or 8 wherein the anion part of the compound according to formula (I) has a molecular weight of less than 1,500 g/mole.

10. The tetrafluoroethene-based fluoropolymer according to any one of embodiments 7 to 9 wherein L in formula (I) is partially fluorinated.

11. The tetrafluoroethene-based fluoropolymer according to any one of embodiments 7 to 10 wherein the fluorinated liquid is selected from a perfluorinated hydrocarbon or a fluorinated (poly)ether according to the formula:

$$Rf\text{-X-O-Rf1} \tag{II}$$

wherein Rf is selected from or partially fluorinated or perfluorinated alkyl group having from 1 to 4 carbon atoms. X is an oxyalkylene or polyoxyalkylene unit having from 1 to 10 carbon atoms; Rf1 is selected from $CH_3$, a partially fluorinated or perfluorinated alkyl group having from 1 to 10 carbon atoms.

12. The melt-processable tetrafluoroethene-based fluoropolymer according to embodiment 11 wherein the fluorinated liquid is selected from the fluorinated (poly)ether according to formula (II) wherein either Rf or Rf1 or both are partially fluorinated.

13. A tetrafluoroethene-based fluoropolymer, having an MFI (265/5) of from about 13 to about 30 g/10 min (ASTM), a melting point (ASTM) of greater than about 170° C., wherein the tetrafluoroethene-based fluoropolymer is a copolymer comprising more than 52% by weight based on the weight of the polymer of units derived from tetrafluoroethene and is selected from copolymers comprising interpolymerized units of tetrafluoroethene and ethene or interpolymerized units of tetrafluoroethene and hexafluoropropene, and wherein the tetrafluoroethene-based fluoropolymer is obtainable by a radical aqueous emulsion polymerization in the presence of one or more fluorinated emulsifiers of the general formula $$R_f\text{-O-L-CO}_2^-X^+ \tag{I}$$

wherein Rf is selected from a partially or fully fluorinated alkyl group that may optionally be interrupted with one or more oxygen atoms; L is selected from a partially or fully fluorinated linear or branched alkylene group that is optionally interrupted with one or more oxygen atoms, and $X^+$ represents a cation or $H^+$.

and one or more fluorinated liquids selected from saturated partially or perfluorinated hydrocarbons which may contain one or more catenary heteroatoms selected from oxygen and/or nitrogen and having a boiling point of greater than 50° C.

14. The fluoropolymer according to embodiment 13 wherein the polymer is selected from copolymers comprising interpolymerized units derived from a) tetrafluoroethene, hexafluoropropene and ethene (HTE) and b) tetrafluoroethene, hexafluoropropene and vinylidene fluoride (THV) and c) tetrafluoroethene and ethene (TFE-E).

15. The tetrafluoroethene-based fluoropolymer according to any one of embodiments 13 or 14 wherein the fluoropolymer is a TFE-E copolymer and comprises from about 10 to about 30% by weight of units derived from ethene with the remainder being units derived from TFE and optionally one or more further comonomers with the proviso that the amount of units derived from TFE is at least 52% by weight.

16. The tetrafluoroethene-based fluoropolymer according to any one of embodiments 13 to 15 wherein the fluoropolymer is an HTE copolymer and comprises from about 10 to about 30% by weight of units derived from hexafluoropropene and from about 5 to about 20% by weight of ethene with the remainder being units derived from TFE and optionally one or more further comonomers with the proviso that the amount of units derived from TFE is at least 52% by weight.

17. The tetrafluoroethene-based fluoropolymer according to any one of embodiments 13 to 16 wherein the fluoropolymer is a THV copolymer comprising from about 10% up to about 40% by weight of units derived from vinylidenefluoride, from about 10 to about 40% by weight of units derived from hexafluoropropene and from 0 to about 10% by weight of further comonomers with the proviso that the amount nits derived from TFE is at least 52% by weight.

18. The tetrafluoroethene-based fluoropolymer according to any one of embodiments 13 to 17 wherein the fluoropolymer has an Mw/Mn ratio of from about 1.4 up to 1.9 and/or is substantially linear.

19. The tetrafluoroethene-based fluoropolymer according to any one of embodiments 13 to 18 wherein the fluoropolymer has a melting point of from about 170° C. to about 230° C.

20. The tetrafluoroethene-based fluoropolymer according to any one of embodiments 13 to 19 wherein L in formula (I) is linear.

21. The tetrafluoroethene-based fluoropolymer according to any one of embodiments 13 to 20 wherein the anion part of the compound according to formula (I) has a molecular weight of less than 1,500 g/mole.

22. The tetrafluoroethene-based fluoropolymer according to any one of embodiments 13 to 21 wherein the L in formula (I) is partially fluorinated.

23. The tetrafluoroethene-based fluoropolymer according to any one of embodiments 13 to 22 wherein the fluorinated liquid is selected from a perfluorinated hydrocarbon, a fluorinated (poly)ether according to the formula:

Rf—X—O—Rf1 (II)

wherein Rf is selected from or partially fluorinated or perfluorinated alkyl group having from 1 to 4 carbon atoms, X is an oxyalkylene or polyoxyalkylene unit having from 1 to 10 carbon atoms; Rf1 is selected from CH₃, a partially fluorinated or perfluorinated alkyl group having from 1 to 10 carbon atoms.

24. The melt-processable tetrafluoroethene-based fluoropolymer according to any one of embodiments 13 to 23 wherein the fluorinated liquid is selected from the fluorinated (poly)ether according to formula (II) wherein either Rf or Rf1 or both are partially fluorinated.

25. An extrusion product comprising the fluoropolymer according to any one of embodiments 1 to 24.

26. The extrusion product of embodiment 25 comprising at least 50% by weight based on the total weight of the extrusion product of the fluoropolymer.

27. The extrusion product of embodiment 26 wherein the extrusion product is a melt pellet or an extruded sheet.

28. A multi-layer article comprising the extruded sheet according to embodiment 27.

29. The multi-layer article of embodiment 28 wherein the article is a protective sheet solar module.

30. The multi-layer article according to any one of embodiments 28 or 29 comprising one or more layers comprising a polymer selected from a polycarbonate, a silicone, a polyester or a polyamide.

31. A process of making an extruded article comprising providing a fluoropolymer composition comprising the fluoropolymer according to any one of embodiments 1 to 24, and subjecting the fluoropolymer composition to melt-extrusion to obtain an extruded article.

32. The process of embodiment 31 wherein the extruded article is a sheet having a thickness of from about 30 to 3,000 μm.

33. The process of embodiments 31 or 32 wherein the article is a multi-layer article.

34. Method of making a fluoropolymer sheet comprising providing a fluoropolymer composition comprising the fluoropolymer according to any one of embodiments 1 to 24 and melt-extruding the fluoropolymer composition into a sheet.

35. Method of making a tetrafluoroethene-based fluoropolymer according to any one of embodiments 1 to 6 comprising polymerizing the monomers making up the fluoropolymer in an aqueous emulsion polymerization using the fluorinated emulsifier according to formula (I) as defined in any one of embodiments 7 to 10 and in the presence of the fluorinated liquid of formula (II) as defined in any one of embodiments 23 or 24.

We claim:

1. A tetrafluoroethylene-based fluoropolymer, having an MFI (265/5) of from about 13 to about 30 g/10 min (ASTM), a melting point (ASTM) of from about 170° C. to about 230° C., wherein the tetrafluoroethylene-based fluoropolymer is a copolymer comprising more than 52% by weight based on the weight of the polymer of units derived from tetrafluoroethylene and is selected from copolymers comprising interpolymerized units of tetrafluoroethylene and ethylene or interpolymerized units of tetrafluoroethylene and hexafluoropropylene, and wherein the tetrafluoroethylene-based fluoropolymer is obtainable by a radical aqueous emulsion polymerization in the presence of one or more fluorinated emulsifiers of the general formula

R$_f$O-L-CO$_2$⁻X⁺ (I)

wherein R$_f$ is selected from a partially or fully fluorinated alkyl group that may optionally be interrupted with one or more oxygen atoms; L is selected from a partially or fully fluorinated linear or branched alkylene group that is optionally interrupted with one or more oxygen atoms, and X⁺ represents a cation or H⁺, and one or more fluorinated liquids selected from saturated partially or perfluorinated hydrocarbons which may contain one or more catenary heteroatoms selected from oxygen and/or nitrogen and having a boiling point of greater than 50° C.;

further wherein the tetrafluoroethylene-based fluoropolymer has an Mw/Mn ratio of from about 1.4 up to 1.9; and the tetrafluoroethylene-based fluoropolymer has a gel content of less than 3,000/m².

2. The tetrafluoroethylene-based fluoropolymer of claim 1 wherein the fluoropolymer is selected from copolymers comprising interpolymerized units derived from a) tetrafluoroethylene, hexafluoropropylene and ethylene (HTE), b) tetrafluoroethylene, hexafluoropropylene and vinylidene fluoride (THV) and c) tetrafluoroethylene and ethylene (TFE-E).

3. The tetrafluoroethylene-based fluoropolymer of claim 1 wherein the fluoropolymer is linear.

4. The tetrafluoroethylene-based fluoropolymer of claim 1 wherein L in formula (I) is linear.

5. The tetrafluoroethylene-based fluoropolymer of claim 1 wherein the anion part of the compound according to formula (I) has a molecular weight of less than 1,500 g/mole.

6. The tetrafluoroethylene-based fluoropolymer of claim 1 wherein L in formula (I) is fluorinated.

7. The tetrafluoroethylene-based fluoropolymer of claim 1 wherein the fluorinated liquid is selected from a perfluorinated hydrocarbon, a fluorinated ether according to the formula:

$$Rf-X-O-Rf1 \qquad (II)$$

wherein Rf is selected from a fluorinated alkyl group having from 1 to 4 carbon atoms, X is an oxyalkylene or polyoxyalkylene unit having from 1 to 10 carbon atoms; Rf1 is selected from $CH_3$, and a fluorinated alkyl group having from 1 to 10 carbon atoms.

8. The tetrafluoroethylene-based fluoropolymer of claim 7 wherein the fluorinated liquid is selected from the fluorinated ether according to formula (II) wherein either Rf or Rf1 or both are fluorinated.

* * * * *

UNITED STATES PATENT AND TRADEMARK OFFICE
CERTIFICATE OF CORRECTION

PATENT NO.       : 9,803,041 B2
APPLICATION NO.  : 14/422764
DATED            : October 31, 2017
INVENTOR(S)      : Harald Kaspar It is certified that error appears in the above-identified patent and that said Letters Patent is hereby corrected as shown below:

Column 8
Line 40, Delete "or perfluorinated)" and insert -- (or perfluorinated) --, therefor.

Column 10
Line 40, Delete "$CF_1CHF-O-(CF_2)O-COOX$:" and insert -- $CF_3CHF-O-(CF_2)O-COOX$: --, therefor.
Line 56, Delete "may" and insert -- may, --, therefor.
Line 58, Delete "not" and insert -- not) --, therefor.

Column 11
Line 52, Delete "(Ha)" and insert -- (IIa) --, therefor.

Column 12
Line 37, Delete "digiutaric" and insert -- diglutaric --, therefor.

Column 14
Line 46, Delete "terephalate)," and insert -- terephthalate), --, therefor.

Column 16
Line 2, Delete "Monomers" and insert -- monomers --, therefor.
Line 18, Delete "6° C." and insert -- 60° C. --, therefor.

Column 17
Line 4, Delete "donor, in" and insert -- donor. In --, therefor.
Line 13, Delete "2005/0060210" and insert -- 2005/0080210 --, therefor.
Line 55, Delete "muitilayer" and insert -- multilayer --, therefor.

Column 20
Line 2, Delete "266°" and insert -- 265° --, therefor.
Line 18, Delete "red/s." and insert -- rad/s. --, therefor.
Line 30, Delete "72" and insert -- 7.2 --, therefor.

Signed and Sealed this
Twentieth Day of February, 2018

Andrei Iancu
*Director of the United States Patent and Trademark Office*

CERTIFICATE OF CORRECTION (continued)
U.S. Pat. No. 9,803,041 B2

Column 22
Line 51, Delete "$H^+$." and insert -- $H^+$, --, therefor.

Column 23
Line 17, Delete "nits" and insert -- units --, therefor.
Line 63, After "sheet" insert -- of --.